United States Patent
Kume et al.

(10) Patent No.: US 10,311,873 B2
(45) Date of Patent: Jun. 4, 2019

(54) VOICE INTERACTION APPARATUS AND VOICE INTERACTION METHOD

(71) Applicant: TOYOTA JIDOSHA KABUSHIKI KAISHA, Toyota-shi, Aichi-ken (JP)

(72) Inventors: Satoshi Kume, Chofu (JP); Atsushi Ikeno, Kyoto (JP); Toshihiko Watanabe, Tokyo (JP); Muneaki Shimada, Tokyo (JP); Hayato Sakamoto, Kawasaki (JP); Toshifumi Nishijima, Kasugai (JP); Fuminori Kataoka, Nisshin (JP); Hiromi Tonegawa, Okazaki (JP); Norihide Umeyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 15/704,770

(22) Filed: Sep. 14, 2017

(65) Prior Publication Data
US 2018/0090145 A1    Mar. 29, 2018

(30) Foreign Application Priority Data

Sep. 29, 2016 (JP) ................. 2016-190586

(51) Int. Cl.
| G10L 15/30 | (2013.01) |
| G10L 15/22 | (2006.01) |
| G10L 13/033 | (2013.01) |
| G10L 17/22 | (2013.01) |
| G10L 25/51 | (2013.01) |

(52) U.S. Cl.
CPC ............ *G10L 15/22* (2013.01); *G10L 13/033* (2013.01); *G10L 15/30* (2013.01); *G10L 17/22* (2013.01); *G10L 25/51* (2013.01); *G10L 2015/223* (2013.01)

(58) Field of Classification Search
None
See application file for complete search history.

(56) References Cited

U.S. PATENT DOCUMENTS

| 2001/0041977 A1* | 11/2001 | Aoyagi | ..................... G06F 3/16 704/246 |
| 2009/0233550 A1* | 9/2009 | Ryu | ..................... H04W 28/18 455/41.2 |
| 2013/0318167 A1* | 11/2013 | Sereboff | ........... G06F 17/30861 709/204 |
| 2015/0169284 A1 | 6/2015 | Quast et al. | |

FOREIGN PATENT DOCUMENTS

| JP | 2005-271098 A | 10/2005 |
| JP | 2005-309604 A | 11/2005 |
| JP | 2015-11621 A | 1/2015 |

\* cited by examiner

*Primary Examiner* — Abul K Azad
(74) *Attorney, Agent, or Firm* — Oliff PLC

(57) ABSTRACT

A voice interaction apparatus includes: a voice recognizer configured to recognize content of a speech of a user; an extractor configured to extract profile information based on a result of the voice recognition, and to specify which user the profile information is associated with; a storage configured to store the extracted profile information in association with the user; an exchanger configured to exchange profile information with another voice interaction apparatus; and a generator configured to generate a speech sentence to speak to the user based on the profile information of the user.

17 Claims, 12 Drawing Sheets

| USER (501) | INFORMATION CONTENT (502) | ACQUISITION DATE/TIME (503) | INFORMATION SOURCE (504) | NOTIFICATION PERMISSION (505) |
|---|---|---|---|---|
| A | FAVORITE DRINK = COFFEE | 2016-10-01 12:00:00 | USER A | ○ |
| A | FAVORITE DRINK = BLACK TEA | 2016-10-01 12:01:00 | ROBOT B | ○ |
| A | LEAST-FAVORITE DRINK = MILK | 2016-10-01 12:02:00 | USER A | × |
| ⋮ | ⋮ | ⋮ | ⋮ | ⋮ |
| B | FAVORITE DRINK = MILK | 2016-10-01 13:00:00 | USER A | ○ |
| ⋮ | ⋮ | ⋮ | ⋮ | ⋮ |

VOICE INTERACTION APPARATUS AND VOICE INTERACTION METHOD

CROSS-REFERENCE TO RELATED APPLICATION

This application claims the benefit of Japanese Patent Application No. 2016-190586, filed on Sep. 29, 2016, which is hereby incorporated by reference herein in its entirety.

BACKGROUND OF THE INVENTION

Field of the Invention

The present invention relates to a voice interaction apparatus, and more particularly to a voice interaction apparatus that generates speech based on profile information related to a user.

Description of the Related Art

Recently the use of voice interaction apparatuses (voice interaction systems) configured to perform voice interaction with a user are becoming widespread. Japanese Patent Application Laid-open No. 2005-309604 discloses a software agent which collects and stores personal information of a user through conversation with the user, and generates questions using the stored personal information of the user.

Japanese Patent Application Laid-open No. 2005-271098 discloses a system in which a plurality of robots (voice interaction terminals) can share information with a server or another robot via a network. In this system, when an emergency occurs to a specific user paired with a specific robot terminal, another robot terminal outputs the personal information of this specific user. In this case, when the personal information of this user is outputted, this robot is controlled to exhibit a performance such that an impression of trespassing on user privacy is not apparent.

Japanese Patent Application Laid-open No. 2005-309604 is based on the assumption that the voice interaction apparatus is operated as a standalone unit. Therefore the personal profile which the voice interaction apparatus directly acquires from the user can be utilized for conversation, but a personal profile which another voice interaction apparatus acquires cannot be utilized for conversation.

Japanese Patent Application Laid-open No. 2005-271098 discloses a feature in which information on an individual is exchanged among a plurality of voice interaction apparatuses, but this is not intended to be applied to a conversation. Further, it is considered that privacy is not invaded when the personal profile is acquired from another voice interaction apparatus, but this consideration is not very effective even though the intent to protect privacy is obviously seen in the behavior of the robots.

SUMMARY OF THE INVENTION

An aspect of the invention is a voice interaction apparatus which generates a speech sentence based on the profile information of the user, so that the profile information is exchanged among a plurality of voice interaction apparatuses, and is effectively utilized for generating speech.

An aspect of the present disclosure is a voice interaction apparatus which may be configured to store profile information of a user for each user. The voice interaction apparatus may include a voice recognizer (voice recognition unit) configured to recognize the content of a speech of a user; an extractor (extraction unit) configured to extract profile information based on the result of the voice recognition, and to specify which user the profile information is associated with; a storage unit configured to store the extracted profile information in association with the user; an exchanger (exchange unit) configured to exchange profile information with another voice interaction apparatus; and a generator (generation unit) configured to generate a speech sentence to speak to the user based on the profile information of the user.

The profile information of a user may be information peculiar to the user. The profile information may be, for example, preferential information (e.g. hobbies, interests) and attribute information (e.g. name, age, gender, race, height, weight). The profile information may be any other arbitrary information of the user, including occupation, annual income, residence, birth place, personal relationships and property.

According to this aspect, the profile information extracted from conversation with the user can be exchanged between the voice interaction apparatuses, and utilized for conversation with the user.

In the present disclosure, an exchange of the profile information with another voice interaction apparatus by the exchange unit may be performed by another method. For example, each voice interaction apparatus may transmit all the stored profile information to the other voice interaction apparatus, or may transmit only the most recently updated profile information to the other voice interaction apparatus. Further, after one voice interaction apparatus transmits the profile information to the other voice interaction apparatus, the other voice interaction apparatus may selectively transmit only the profile information which the former voice interaction apparatus does not have. The profile information may be exchanged by direct communication between the voice interaction apparatuses, or by communication via another apparatus.

The voice interaction apparatus according to the present disclosure may further include a comparator (comparison unit) configured to detect a difference between profile information stored in the storage unit and profile information acquired from another voice interaction apparatus via the exchanger, wherein the generator generates a speech sentence to speak to the user based on the difference.

An example of the difference may be the existence of contradictory items. In concrete terms, this is a case when an item included in the profile information stored in the storage unit contradicts an item included in the profile information which was acquired from another voice interaction apparatus via the exchange unit. For example, one profile information indicates that "the user likes coffee", but the other profile information indicates that "the user doesn't like coffee". In this case, it is preferable that the generator generates a question on this contradictory item as a speech sentence.

Another example of the difference may be the existence of a new item. In concrete terms, this is a case when an item that is not stored in the storage unit exists in the profile information of the user acquired from another voice interaction apparatus via the exchange unit. For example, profile information acquired from another voice interaction apparatus includes an item that "the user likes black tea", but no such item is stored in the storage unit. In this case, it is preferable that the generator generates a question on this new item as a speech sentence.

A question about an item may have any sentence as long as correct profile information about this item can be acquired by this question.

The profile information of the user in the storage unit may be updated based on the answer of the user to this question.

If this configuration is used, true/false (correct/incorrect) of the profile information acquired from another voice interaction apparatus can be confirmed, and the profile information in the storage unit can be updated based on this confirmation result. Thereby reliability of profile information stored in the voice interaction apparatus can be improved.

In this aspect, the storage unit may store a reliability value in association with the profile information. The reliability value may indicate the likelihood of the profile information of the user. Further, the reliability value of the profile information may be increased when it is determined that the profile information stored in the storage unit is correct based on the answer of the user to the question. The reliability value of the profile information may be decreased when it is determined that the profile information stored in the storage unit is incorrect based on the answer of the user to the question. Here the reliability value may indicate the likelihood of the entire user profile information of a user, or may indicate the likelihood of one item in the profile information.

By updating the reliability value of the profile information in accordance with the result of the question to the user in this way, the reliability of the profile information in the storage unit can be known.

Further, correct/incorrect information may be transmitted to the other voice interaction apparatus. The correct/incorrect information may indicate whether the profile information acquired from another voice interaction apparatus is correct or not. The correct/incorrect information may be determined based on the answer of the user to the question. When the voice interaction apparatus receives the correct/incorrect information from the other voice interaction apparatus, the voice interaction apparatus may update the reliability value of the profile information based on the received correct/incorrect information.

According to this configuration, the voice interaction apparatus can update the reliability value based on the correct/incorrect information.

Further, the generation unit may change the speech content in accordance with the reliability value of the profile information. For example, the generation unit may generate a speech content in a more assertive tone (e.g. ". . . isn't it?") when the reliability value is high, and a speech content in a less assertive tone (e.g. "perhaps . . . right?") when the reliability value is low.

Further, the exchange unit may be configured to not transmit the profile information to another voice interaction apparatus if the reliability value of the profile information is low (i.e. lower than a threshold).

It is not limited how the profile information is exchanged between voice interaction apparatuses. For example, a voice interaction apparatus may directly perform wireless communication with another voice interaction apparatus, and the exchanger may directly exchange profile information with the other voice interaction apparatus. Alternatively, the voice interaction apparatus and another voice interaction apparatus may communicate via a server, and the exchanger may exchange profile information with the other voice interaction apparatus via the server. Alternatively still, the storage units of the voice interaction apparatus and another voice interaction apparatus may exist on a server, and the voice interaction apparatus and the other voice interaction apparatus may exchange profile information onboard the server.

If the voice interaction apparatus can directly perform wireless communication with another voice interaction apparatus, the exchanger may exchange profile information with the other voice interaction apparatus when direct wireless communication with the other voice interaction apparatus is established. As long as the establishment of direct communication triggers the exchange of profile information, the profile information need not be exchanged by direct communication, but may be exchanged via a server or onboard a server.

The situation in which the voice interaction apparatuses can directly communicate with each other may indicate a situation where the voice interaction apparatuses can directly perform "conversation" with each other. Therefore under such a situation, the user may experience less discomfort even if profile information is exchanged.

Further, it is preferable that the exchange unit exchanges the profile information with the other voice interaction apparatus when a start instruction is received from the user. In this case, exchange of the profile information may be started when both the voice interaction apparatuses receive the start instruction from the users. Alternatively, when a voice interaction apparatus receives the start instruction from the user, the voice interaction apparatus may transmit the profile information in the storage unit to the other voice interaction apparatus, even if the other voice interaction apparatus did not receive the start instruction.

Further, the voice interaction apparatus may memorize a permitted voice interaction apparatus in advance, and when wireless communication is established between the permitted apparatus, the profile information may be exchanged with the permitted apparatus regardless of whether the start instruction is received from the user or not.

If voice interaction apparatuses which are permitted to exchange profile information can be specified in advance like this, the extra time required for instructing the start of exchange of the profile information can be avoided, and user privacy can also be protected.

The voice interaction apparatus may be constituted by one apparatus, or may be constituted by a plurality of apparatuses which are connected by some form of communication. If the voice interaction apparatus is constituted by a plurality of apparatuses, the voice interaction apparatus may be constituted by, for example: a front end apparatus which includes a microphone and a speaker; a computer which communicates with the front end apparatus; and one or a plurality of server(s) configured to voice recognition, speech sentence creation and the like according to the instruction from the computer.

The present invention can be interpreted as a voice interaction apparatus which includes at least a part of the above mentioned features. The present invention can also be interpreted as a voice interaction system constituted by the plurality of voice interaction apparatuses. The present invention can also be interpreted as a voice interaction method of executing at least a part of the above mentioned processing. Furthermore, the present invention may be interpreted as a computer program to cause the computer to execute this method, or as a non-transitory computer-readable storage medium storing this computer program. The present invention can be configured by combining the above mentioned units and processing as much as possible.

According to the present invention, in a voice interaction apparatus configured to generate a spoken sentence based on the profile information of the user, the profile information can be exchanged among a plurality of voice interaction apparatuses, and be effectively utilized for generating speech.

BRIEF DESCRIPTION OF THE DRAWINGS

FIG. 5 is an example of a table of the profile information storage unit;

DESCRIPTION OF THE EMBODIMENTS

<Overview>

An embodiment of the present invention will be described in detail with reference to the drawings. In this embodiment, it is assumed that a voice interaction apparatus is configured as a robot simulating a human or an animal, and is owned by a specific owner-user.

The voice interaction robot may extract and store profile information of the owner-user and other users through conversation with the owner-user. When the voice interaction robot encounters another voice interaction robot, profile information owned by a respective robot may be exchanged so as to utilize this information for subsequent conversations.

The information acquired from another voice interaction robot is not always correct, hence in this embodiment, a system to guarantee reliability of the profile information acquired from another voice interaction robot may be installed.

Figure 1A:
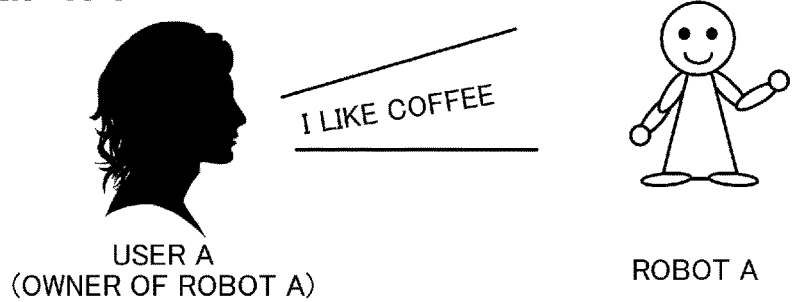
FIG. 1A to FIG. 1C are diagrams depicting an overview of exchanges of profile information between voice interaction apparatuses and the confirmation processing thereof according to an embodiment.
Figure 1B:
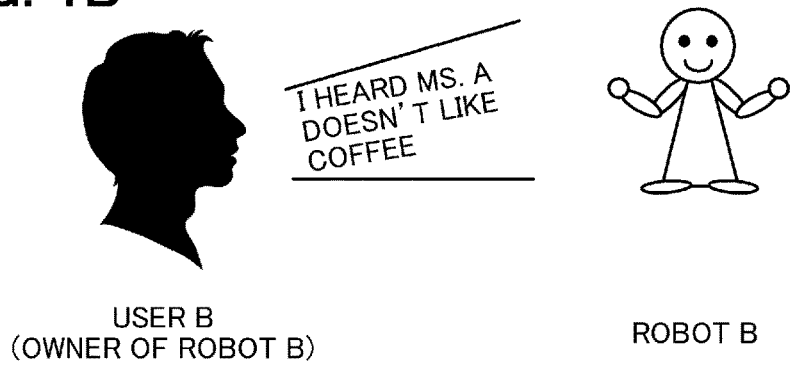
Figure 1C:
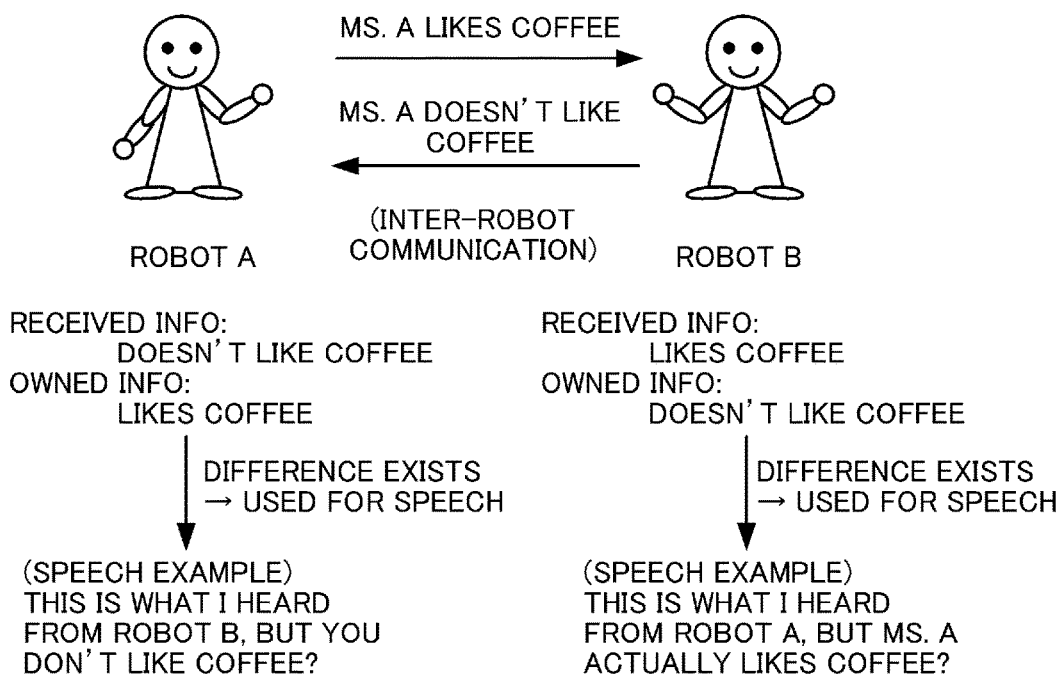

FIG. 1A to FIG. 1C are diagrams depicting an outline of operation according to this embodiment. In FIG. 1A, user A, who is an owner of voice interaction robot A, says "I like coffee" to robot A. Thereby the information "user A likes coffee" is stored in robot A. In FIG. 1B, on the other hand, user B, who is an owner of robot B, says "I heard that Ms. A doesn't like coffee" to robot B. Thereby information that "user A doesn't like coffee" is stored in robot B.

FIG. 1C indicates an exchange of profile information when robot A and robot B encounter each other. The information "user A likes coffee" is transmitted from robot A to robot B, and the information "user A doesn't like coffee" is transmitted from robot B to robot A. In both robot A and robot B, the profile information received from the other robot contradicts its own profile information. Therefore each robot asks a question to the respective owner-user in order to confirm which profile information is correct.

Robot A may ask user A, for example, "This is what I heard from robot B, but you don't actually like coffee?". And robot B may ask user B, for example, "This is what I heard from robot A, but Ms. A actually likes coffee?". These question sentences are only examples, and the speech content is arbitrary as long as true/false (correct/incorrect) of the profile information can be confirmed.

The voice interaction robot may update the profile information in accordance with the answers from the user to such questions to confirm the true/false of the profile information. Thereby more accurate information can be stored when profile information is received from another voice interaction robot.

This example is the case when contradictory profile information is exchanged, but it is preferable to confirm true/false also in the case when the received profile information is new information (information that is not stored on this voice interaction apparatus).

<Apparatus Configuration>

Figure 2:
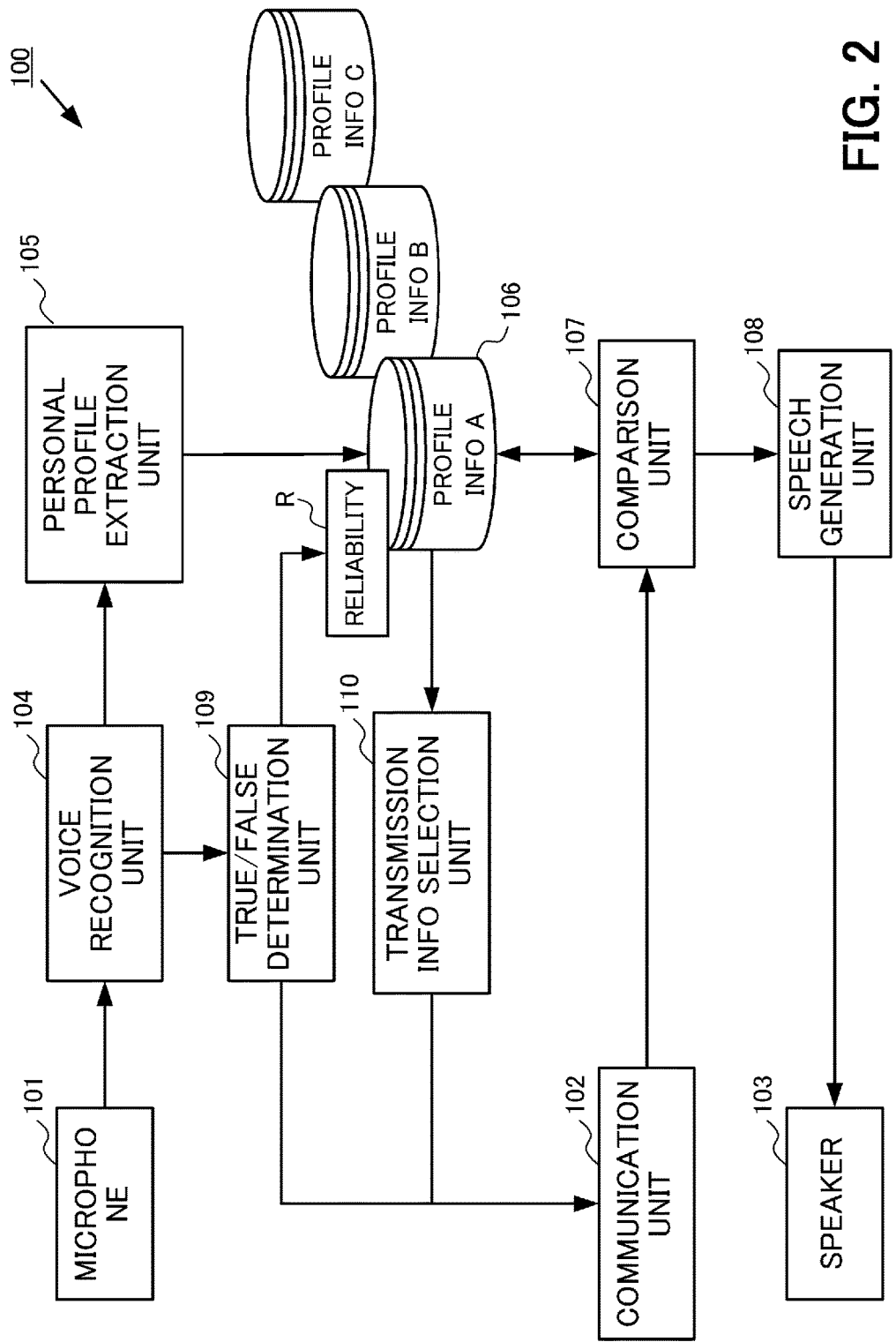
FIG. 2 is a diagram depicting a functional configuration of a voice interaction robot (voice interaction apparatus) according to the embodiment.

FIG. 2 is a diagram depicting a configuration of the voice interaction robot 100 according to this embodiment. The voice interaction robot 100 may include a microphone 101, a communication unit 102, a speaker 103, an arithmetic unit (microprocessor), a memory and the like. The arithmetic unit executes a program stored in memory, so as to function as: a voice recognition unit 104, a personal profile extraction unit 105, a profile information storage unit 106, a comparison unit 107, a speech generation unit 108, a true/false determination unit 109, and a transmission information selection unit 110. Some or all of these functional units may be implemented by a dedicated logic circuit using an ASIC, FPGA or the like, or by a hardware device. The voice interaction robot 100 may include an image input unit (camera), movable joints (face, arms, legs, etc.), a driving control unit for the movable joints, various lights, a control unit to turn these lights ON/OFF and the like.

The microphone 101 may be one or a plurality of microphone(s) or a microphone array configured to acquire the speech (utterance) of the user. The speaker 103 is used to reproduce speech (utterance) for the user.

The communication unit 102 may perform wireless communication with another voice interaction robot. The communication unit 102 may perform wireless communication with another voice interaction robot using Bluetooth® or wireless LAN (ad hoc mode), for example. The communication unit 102 may communicate with another voice interaction apparatus using wireless LAN (infrastructure mode), long term evolution (LTE) or the like. The communication unit 102 may be also used for exchanging profile information with another voice interaction robot.

The voice recognition unit 104 may generate text by analyzing and recognizing the speech content of the user, which is inputted via the microphone 101. The voice recognition unit 104 may perform pre-processing such as noise removal, sound source separation, and speech feature value extraction. The voice recognition unit 104 may include dictionaries for voice recognition, such as acoustic models, language models and pronunciation dictionaries, and may convert the speech content into text by referring to these dictionaries. The voice recognition unit 104 may estimate the subject of a conversation based on the speech content of the user, or may estimate the emotion of the user based on the content or voice feature value of the speech of the user.

The personal profile extraction unit 105 may extract the profile information from the result of the voice recognition by the voice recognition unit 104. The profile information of a user is information peculiar to the user. Examples of the profile information are: preferential information (e.g. hobbies, interests), and attribute information (e.g. name, age, gender, race, height, weight).

The personal profile extraction unit 105 may extract the content of the profile information and the user whom this profile information is associated with. For example, if user A says "I like coffee", the profile information "favorite drink =coffee" is extracted as the profile information of "user A". If user A says "Mr. B likes black tea", the information "favorite drink =black tea" is extracted as the profile information of "user B". The profile information extracted by the personal profile extraction unit 105 may be stored in the profile information storage unit 106.

It is preferable that the voice interaction robot 100 includes a user identification unit. This is because when a user says "I like coffee", the user can be identified. The user identification unit can identify the user with identification based on biological information (e.g. face, voice print), or with identification based on IC tags, magnetic cards, two-dimensional codes or the like.

The profile information storage unit 106 may store the profile information for each user. The profile information storage unit 106 may store not only the profile information extracted by the personal profile extraction unit 105, but also the profile information acquired by communication with other voice interaction robots. The date/time when the profile information was acquired, the information source, and the notification permissions to other voice interaction robots may be stored in the profile information storage unit 106 in association with the content of the profile information. Profile information acquired from another voice interaction robot may be stored in association with a flag, which indicates whether true/false thereof has been confirmed.

The profile information storage unit 106 may also store a reliability value R in association with the profile information. The reliability value R is an index to indicate the likelihood of the profile information. For the reliability value R, one value may be defined for the entire profile information storage unit 106, one value may be defined for each user, or one value may be defined for each item of the profile information. As mentioned later, the reliability value R is updated based on the answer to the question to the user to confirm true/false of the profile information.

The comparison unit 107 may compare the profile information which is acquired from another voice interaction robot via the communication unit 102 and the profile information stored in the profile information storage unit 106, and detects the difference thereof. To simplify description, the profile information acquired from another voice interaction robot is called "received profile information" or simply "received information". In the same manner, the stored profile information is called "owned profile information" or simply "owned information".

It is preferable for the comparison unit 107 to determine that there is a difference between the received information and the owned information when the received information and the owned information are contradictory, and when the received information has information which is not included in the owned information. In a case when information not included in the received information is included in the owned information, the comparison unit 107 need not determine that there is a difference, since this difference is meaningless in terms of acquiring (learning) profile information. The comparison unit 107 may output the kind of differences that exist between the received information and the owned information.

The speech generation unit 108 may generate text of a speech sentence in order to speak to a user, based on the difference between the owned information and the received information detected by the comparison unit 107. When there is a contradictory item between the owned information and the received information, for example, the speech generation unit 108 may generate a question sentence to confirm which information is correct. Further, when an item included in the received information is not included in the owned information, the speech generation unit 108 may generate a question sentence to confirm whether the profile information of this item is correct or not. In this case, the speech generation unit 108 may change the content of the speech considering the reliability value R of the profile information.

The speech generation unit 108 may generate not only a speech sentence to confirm the difference of the profile information, but also a speech sentence in the conversation with the user in normal discourse. In this case, the speech generation unit 108 determines the content of the speech sentence with reference to the profile information stored in the profile information storage unit 106.

The speech sentence generated by the speech generation unit 108 may be converted into voice data by a voice synthesis unit (not illustrated), and is outputted via the speaker 103.

The true/false determination unit 109 may determine the true/false (correct/incorrect) of the received profile information depending on the answer from the user to the question sentence based on the difference between the owned information and the received information. If the received information and the owned information are contradictory, the true/false of the received information corresponds to the true/false of the owned information. If the received information is new information, on the other hand, the true/false of the received information is unrelated to the true/false of the owned information.

The true/false determination unit 109 may update the content of the profile information storage unit 106 and the reliability value R based on the determination result. In concrete terms, if it is determined that the received information is correct, the received information is stored in the profile information storage unit 106. Furthermore, if the owned information is correct, the reliability value R is increased, and if the received information is correct, the reliability value R is decreased.

The transmission information selection unit 110 may select the profile information to be transmitted when the profile information is exchanged with another voice interaction robot via the communication unit 102. The transmission information selection unit 110, for example, may select an information item which satisfies one or more of the following condition: an information item belongs to the profile information on an owner of the communication partner voice interaction robot; an information item is acquired within a predetermined period from the current time; and notification is permitted. If the reliability value R is defined for each information item or is defined for each information source, the information item may be selected when the reliability value R of the information item or the information source is a threshold value or more (selection condition). Furthermore, when the true/false determination result of the profile information acquired from the communication partner voice interaction robot is accessible, the transmission information selection unit 110 also selects this true/false determination result (correct/incorrect information) as transmission information.

<Processing>

[General Processing]

Figure 3:
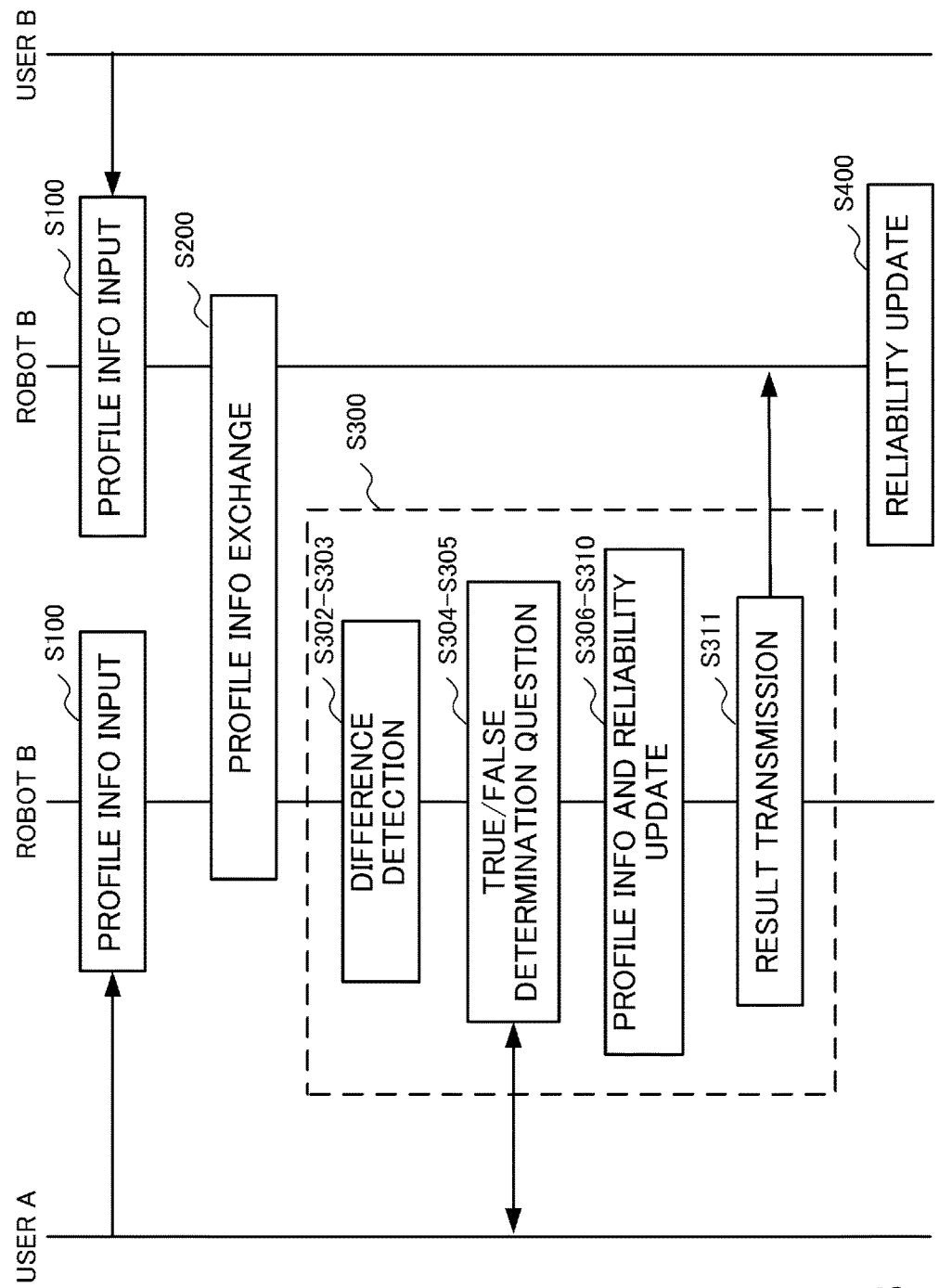
FIG. 3 is a flow chart depicting a general processing flow of the voice interaction robot (voice interaction apparatus) according to the embodiment.

FIG. 3 is a diagram depicting a general flow of the processing according to this embodiment. As depicted in FIG. 3, the processing in this embodiment may include a step of the voice interaction robot inputting the profile information from the user (S100), a step of exchanging profile information between the robots (S200), a step of confirming the difference between the received profile information and the owned profile information to the user when profile information is received (S300), and a step of updating the reliability value (S400).

In FIG. 3, for brevity, it is depicted as if only robot A confirms the difference of the profile information, but robot B also performs the same processing.

Each processing in FIG. 3 will be described in detail.

[1. Profile Information Input Processing]

Figure 4:
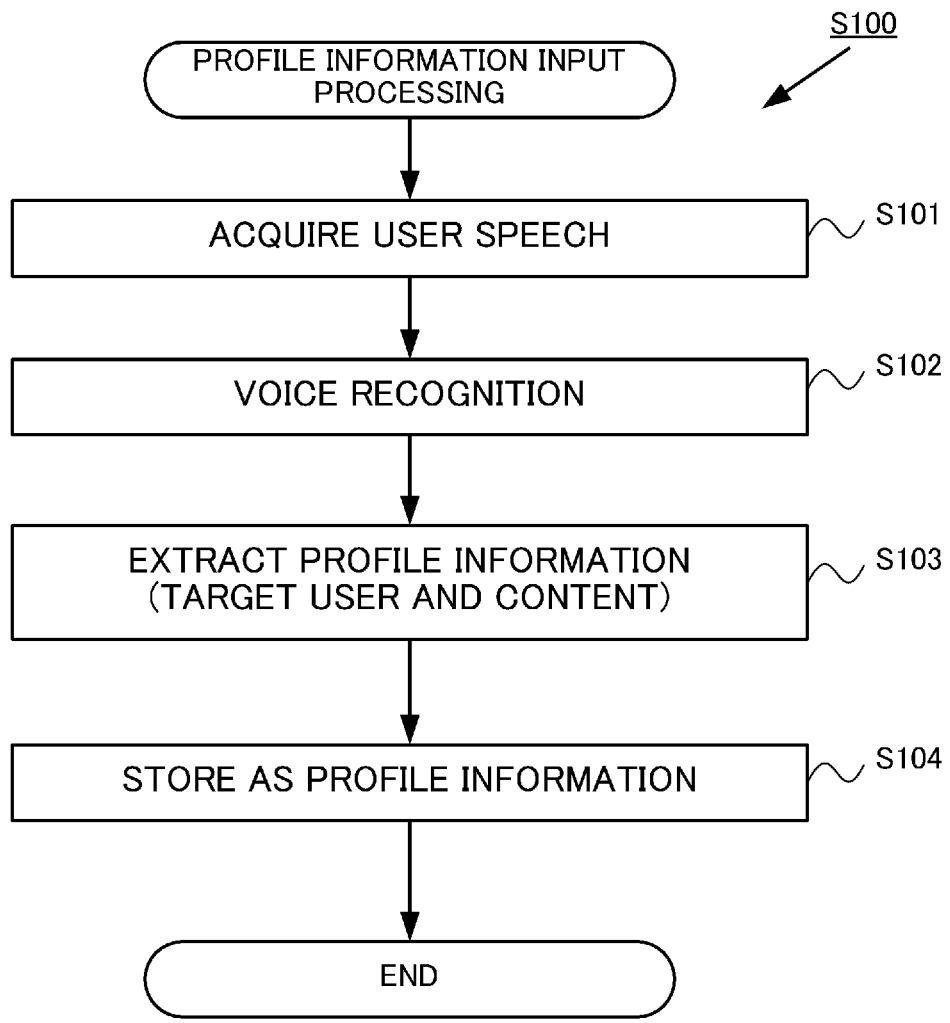
FIG. 4 is a flow chart depicting a flow of the profile information input processing.

FIG. 4 is a flow chart depicting details of the profile information input processing S100.

In step S100, the voice interaction robot 100 acquires the speech of the user via the microphone 101. In step S102, the voice recognition unit 104 recognizes the inputted voice and generates text of the speech content. For example, as a result of voice recognition, the voice recognition unit 104 determines that the speech of the user is "I like coffee".

Before step S101, the voice interaction robot 100 may speak to prompt the input of profile information. For example, the voice interaction robot 100 says "Ms. A, do you like coffee?", or "Ms. A, what is your favorite drink?" to prompt the user to input profile information.

In step S103, the personal profile extraction unit 105 extracts the profile information from the result of voice recognition. In concrete terms, content of the profile information and a user whom this content is associated with are extracted from the result. If the speech content of user A is "I like coffee", then "favorite drink =coffee" is extracted as the profile information of "user A". If the speech content of user A is "I heard Mr. B likes black tea", then "favorite drink =black tea" is extracted as the profile information of "user B".

In order to enable understanding that "I" in the speech indicates "user A", it is preferable that the voice interaction robot 100 can identify which user is the interaction partner by face recognition, voice print recognition, IC tags or the like. It is also preferable to store information on personal relationships of the user in advance, so that the individual can be specified by the name "Mr. B".

In step S104, the profile information extracted in step S103 is stored in the profile information storage unit 106.

FIG. 5 is an example of a table of the profile information storage unit 106. The column 501 indicates the user that the profile information is associated with. The column 502 stores the content of the profile information. The column 503 stores date and time when the profile information was acquired. The column 504 stores the information source of the profile information. For example, if the profile information was acquired by conversation with the user, the user identification is stored in the column 504. When profile information is acquired from another robot, this robot identification is stored in the column 504. If the profile information is acquired from another voice interaction robot, the original information source (typically one of the users) may also be stored, or all the information sources may be stored.

The column 505 indicates whether it is permissible to notify (transmit) the profile information to another voice interaction robot. Although not illustrated in the drawings, as to the information source is the profile information of an individual other than the owner, the table may include a column to indicate whether true/false of the profile information has been confirmed to the individual or not.

In the stage of step S104, information need not be stored in all the columns of the table of the profile information storage unit 106. For example, the notification permission (505) column may be blank until confirmation is received from the user. As another method, the default setting (permissible or not) may be stored in the notification permission (505) column in the stage of step S104.

By repeating this processing, the voice interaction robot can store various profile information of users. The conversation partner of the voice interaction robot is not limited to the owner-user, but the voice interaction robot may acquire profile information by conversation with a user other than the owner-user.

[2. Profile Information Exchange Processing]

Figure 6:
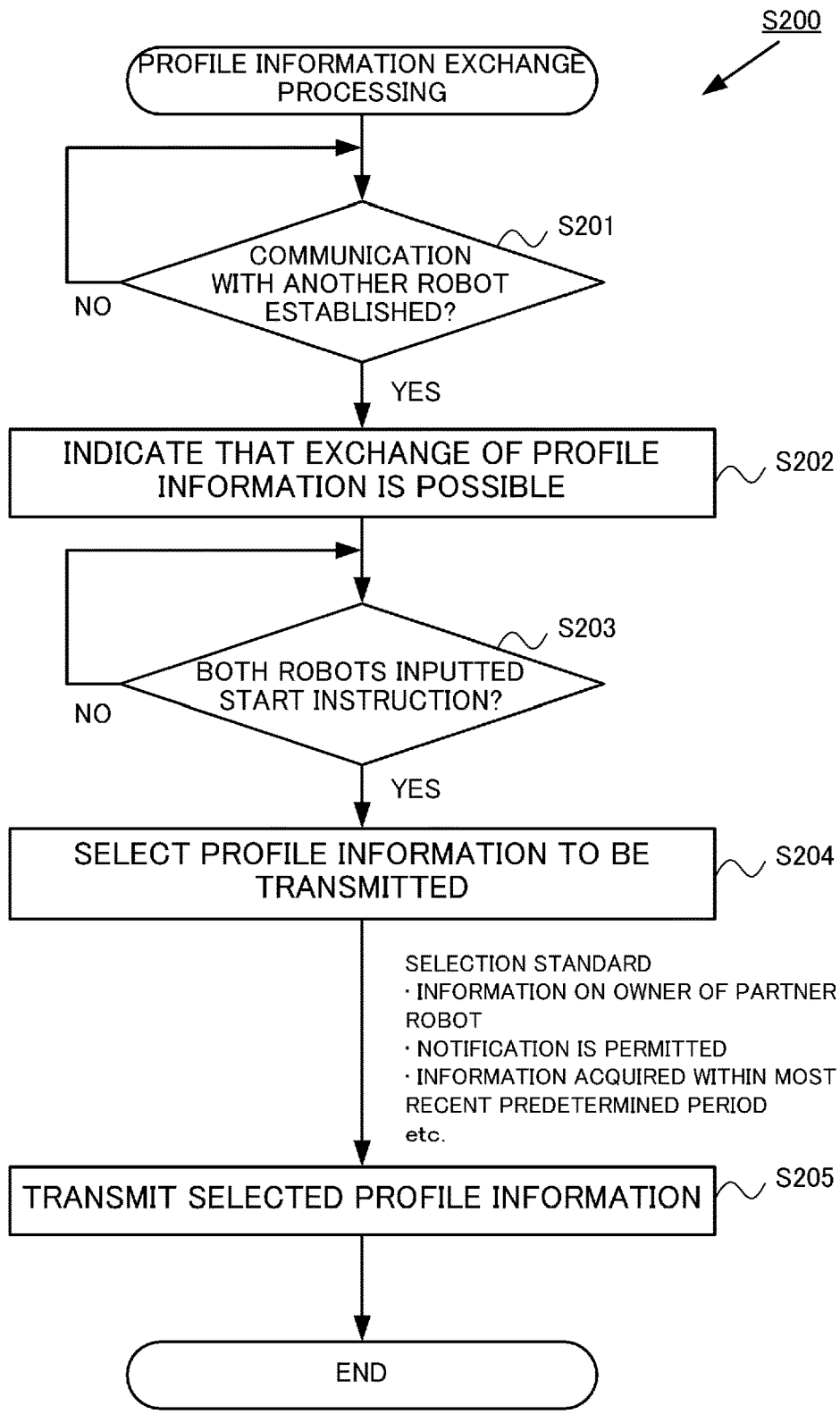
FIG. 6 is a flow chart depicting a flow of the profile information exchange processing.

FIG. 6 is a flow chart depicting details of the profile information exchange processing S200.

In step S201, it is determined whether communication is established with another voice interaction robot. The communication unit 102 periodically transmits a beacon and establishes communication if the beacon is received from another voice interaction robot. In this case, the other voice interaction robot with which communication is established can be identified by notifying the personal ID of the voice interaction robot.

When communication is established with the other voice interaction robot (YES in S201), the user is notified that profile information can be exchanged with the other robot in step S202. The mode of communication is not especially limited, and can be voice output, a lit and flashing light or the like.

In this embodiment, if both of the two robots receive permission from the respective users during communication, the exchange of profile information starts. Therefore in step S203, the voice interaction robots standby until the profile information start instruction is inputted to both of the robots. The method for inputting the start instruction from the user is not especially limited, and may be performed by voice instruction, pressing a button or the like. When the start instruction is inputted from the user, the robot notifies this state to the communication partner robot. When the start instruction is inputted from the user to the robot, and the robot receives notification that the start instruction is inputted to the communication partner robot, processing advances to step S204.

In step S204, the transmission information selection unit 110 selects profile information to transmit to the communication partner robot. The reference of this selection is not especially limited. For example, the profile information on the owner-user of the communication partner robot is selected with priority. Further, the profile information of which notification is prohibited (or for which notification is not permitted) is not selected. The profile information of which acquisition date and time is newest may be selected with highest priority, or only the profile information of which acquisition date and time is within a latest predetermined period may be selectable. When the reliability value R is defined for each item (record) of the profile information, only items of which the reliability value R is a threshold or more may be selectable. When the reliability value R is defined for each information source, only items of which the reliability value R of the information source is a threshold or more may be selectable.

In step S205, the communication unit 102 transmits the profile information selected in step S204 to the communication partner robot, and receives profile information transmitted from the partner robot. It is preferable to transmit all the profile information selected in step S204 to the partner robot, but transmission of information may be omitted if it is already owned by the partner robot. The profile information received from the partner robot may be reflected in the profile information storage unit 106 immediately, or may be stored in a temporary data base which is different from the profile information storage unit 106.

The exchange of the profile information between the voice interaction robots is completed by the above processing.

[3. Processing when Profile Information is Received]

Figure 7:
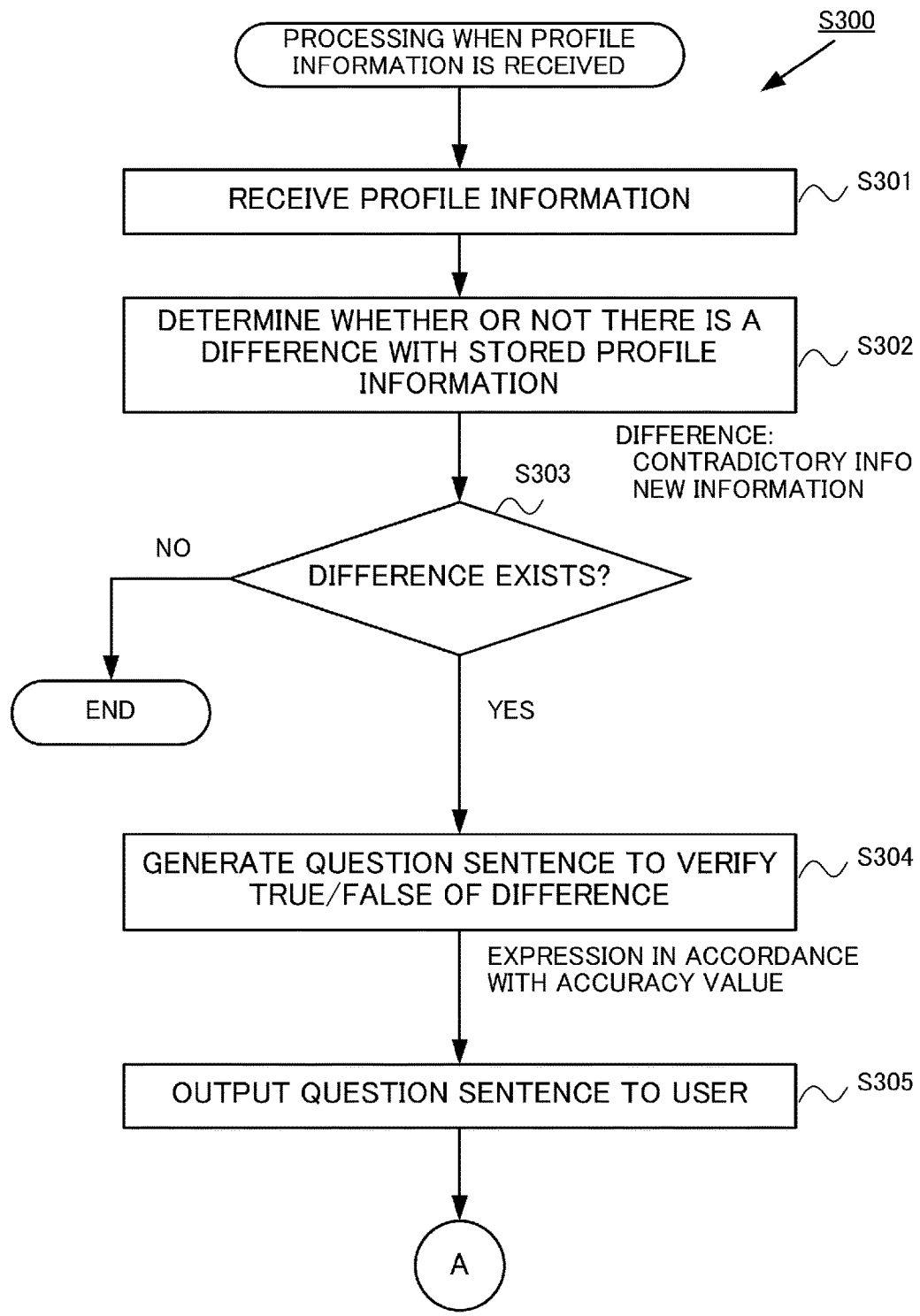
FIG. 7 is a flow chart depicting a flow of processing when the profile information is received.
Figure 8:
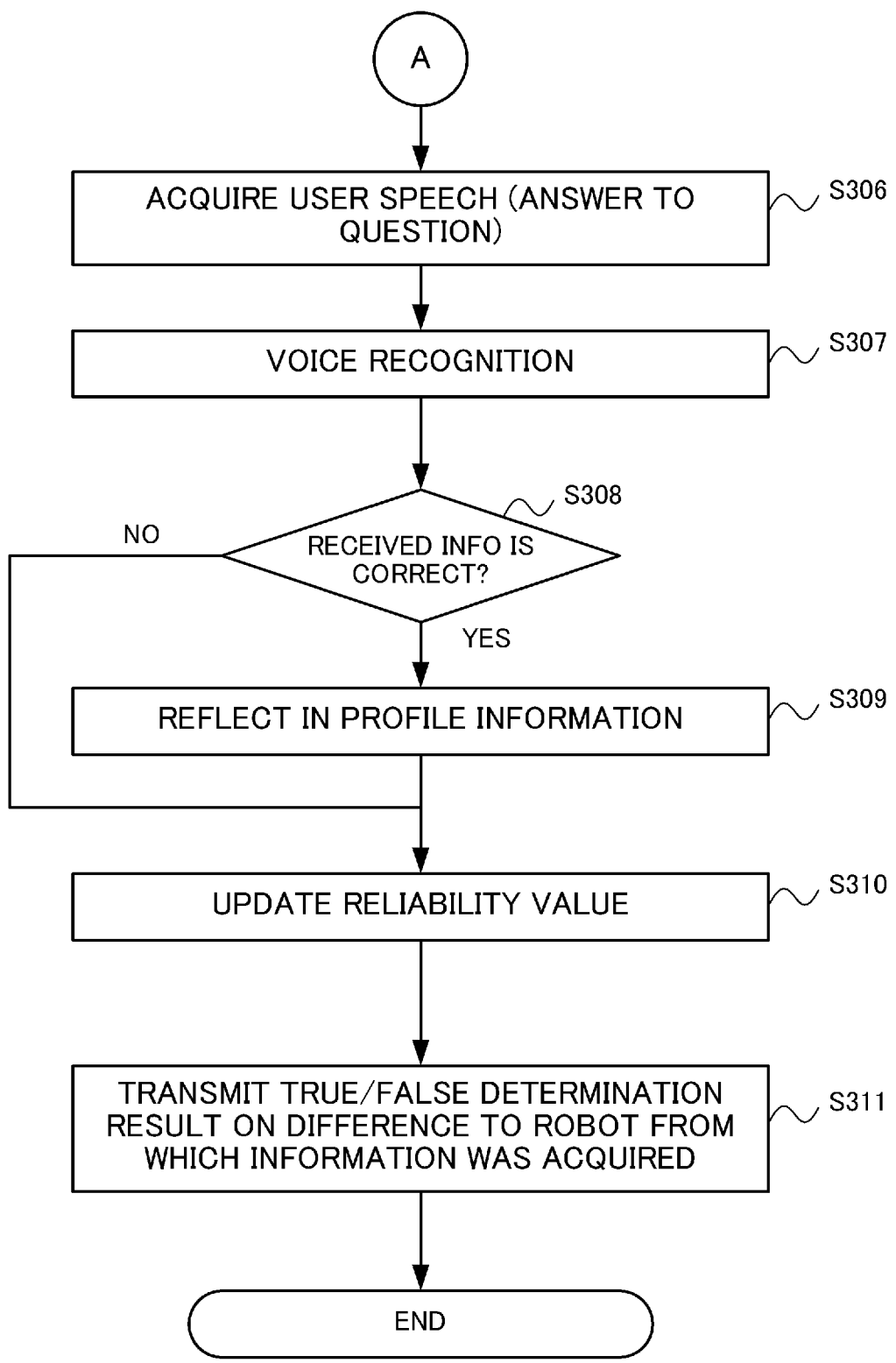
FIG. 8 is a flow chart depicting a flow of processing when the profile information is received.

FIG. 7 and FIG. 8 are flow charts depicting details of the processing S300 when the profile information is received.

When profile information is received from another robot in step S301, the comparison unit 107 compares the received profile information and the owned profile information, and detects the difference thereof in step S302. In this case, the difference detection target may include only the profile information on the owner-user, or may include the profile information of other users. The detection of the difference (S302) need not be performed immediately after receiving the profile information (S301), and the performing timing is not especially limited.

The case in which the received information and the owned information differ includes: a case when the two pieces of information are contradictory to each other, or a case when the received information includes a new item, as mentioned above.

If there is no difference between the received information and the owned information (NO in S303), processing ends. If there is a difference (YES in S303), processing advances to step S304 and subsequent processing.

In step S304, the speech generation unit 108 generates a dialog sentence to verity the detected difference. For example, if the owned information and the received information are contradictory to each other, (e.g. the owned information is "user A likes coffee" and the received information is "user A doesn't like coffee"), one of the following dialog sentences may be generated.

"Ms. A, you don't like coffee?"
"Ms. A, do you like coffee?"
"Ms. A, you like coffee, don't you?"
"Ms. A, do you like coffee? or you don't"
"Robot B told me that you don't like coffee, but is this true?"

These are only examples, and the content of speech can be changed as appropriate. For example, instead of asking a direct question about an item to be verified, an indirect question, such as "What is your favorite drink, Ms. A?" may be used for verification.

Here it is also preferable that the speech generation unit 108 adjusts the tone of the dialog sentence using reliability values R of the owned information and the received information. For example, if the reliability value of the owned information is higher than the reliability value of the received information, a speech sentence having content based on the assumption that the owned information is correct may be generated. Obversely, if the reliability value of the received information is higher than the reliability value of the owned information, a speech sentence having content based on the assumption that the received information is correct may be generated.

In the case when the received information includes new information, the speech generation unit 108 may generate a dialog sentence to confirm whether the content of the received information is correct or not if information not included in the owned information is included in the received information. For example, if information "user A likes beer" is not included in the owned information but is acquired as the received information, it is possible to generate such a dialog sentence as "robot B told me that you like beer, is this true?". Here it is also preferable to adjust the tone in accordance with the reliability value of the received information.

In step S305, the voice interaction robot voice-synthesizes the generated question sentence, and outputs this sentence via the speaker 103. In step S306, the voice interaction robot acquires the answer of the user to the question via the microphone 101. In step S307, the voice recognition unit 104 performs the voice recognition processing for the acquired answer of the user.

In step S308, it is determined whether the answer from the user indicates that the received profile information is correct. If it is determined that received profile information is correct (YES in S308), the received profile information is reflected in the profile information storage unit 106 in step S309. For example, the received profile information stored in a temporary table is registered in the table in the profile information storage unit 106. Or in the case when the received profile information is registered in the table of the profile information storage unit 106 as unconfirmed information, the status of this received profile information is updated to "confirmed".

In step S310, the reliability value R of the profile information is updated based on the result of confirming true/false of the received profile information. For example, if it is determined that the owned profile information is correct in an answer to a question, the reliability value R of the owned profile information is incremented (+1), and if it is determined that the owned profile information is incorrect, the reliability value R of the owned profile information is decremented (−1). If it is determined that the received profile information is correct, the reliability value R of the profile information, of which information source is the partner robot, may be incremented (+1), and if it is determined that the received profile information is incorrect, the reliability value R of the profile information, of which information source is the partner robot, may be decremented (−1).

In step S311, the result of confirming true/false of the received profile information is transmitted to the communication partner robot. In the flow chart in FIG. 8, the result is transmitted to the communication partner robot immediately after confirming with the user, but it is not always certain that communication with the partner robot is enabled. Therefore the confirmation result by the user may be stored in advance, and the confirmation result may be transmitted when communication with the other robot is enabled (YES in step S201 in FIG. 6 and later).

[4. Processing when True/False Determination Result is Received]

Figure 9:
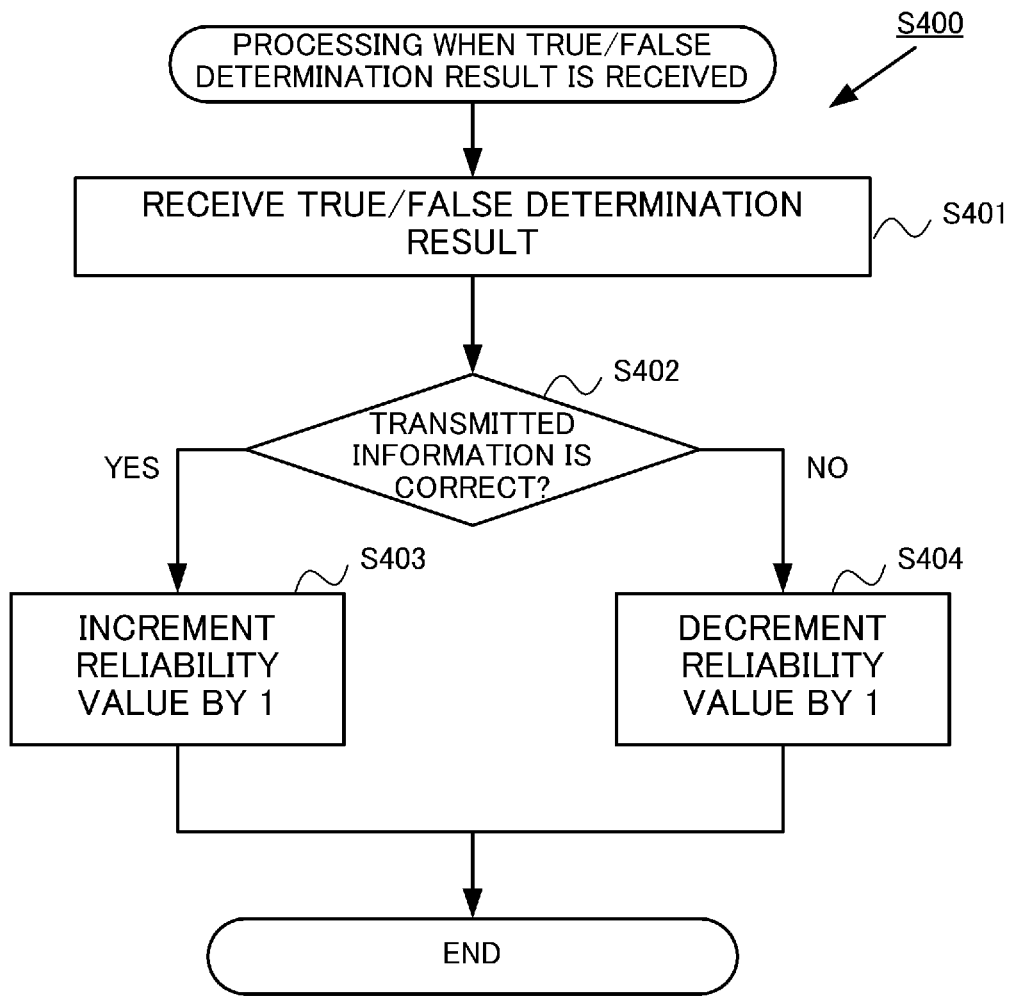
FIG. 9 is a flow chart depicting a flow of processing when the true/false determination result of the profile information is received.

FIG. 9 is a flow chart depicting processing in the case when the true/false determination result of the profile information is received from another voice interaction robot.

In step S401, the true/false determination result of the profile information is received from the partner robot. The true/false determination result that is received here is on the profile information (owned profile information), which this robot transmitted to the partner robot.

If the profile information (owned profile information) transmitted to the partner robot is correct (YES in S402), the reliability value R of the owned information is incremented (+1) in step S403, and if incorrect (NO in S402), the reliability value R of the owned profile information is decremented (−1) in step S404.

By confirming with the user whether the profile information is correct or not and updating the reliability value of the profile information according to this result, the likelihood of the profile information owned by each robot can be quantified or digitized. The voice interaction robot 100 determines the speech content to the user based on the profile information. In this case, the speech content can be adjusted in accordance with the reliability value R of the profile information. In concrete terms, speech content is determined so that the tone is more assertive as the reliability value is higher, and the tone is less assertive as the reliability value is lower. For example, the speech sentence to a user of whom profile information indicates that this user likes coffee may be "You like coffee, don't you?" if the reliability value R is high, and "By any chance, do you like coffee?" if the reliability value R is low.

<Advantageous Effect of this Embodiment>

According to this embodiment, profile information can be exchanged among a plurality of voice interaction robots, and acquired information can be used for conversation with the user. Since not only the profile information directly acquired from the user, but also the profile information acquired from the other voice interaction robots can be utilized, the range of conversation can be expanded.

Further, a structure to confirm true/false of the profile information acquired from another voice interaction robot is used, hence it can be prevented that an incorrect information is shared and used without correction.

Further, the likelihood of the profile information can be recognized by a numeric value (reliability value), hence speech content in accordance with the likelihood of the profile information can be generated when speech is performed based on the profile information.

Further, when profile information is shared between voice interaction robots, permission is received from the owner-users of both robots, hence privacy can be ensured. Furthermore, notification permitted/not permitted is set for each item of the profile information, hence fine tuned management can be exercised.

<Modification 1>

Figure 10A:
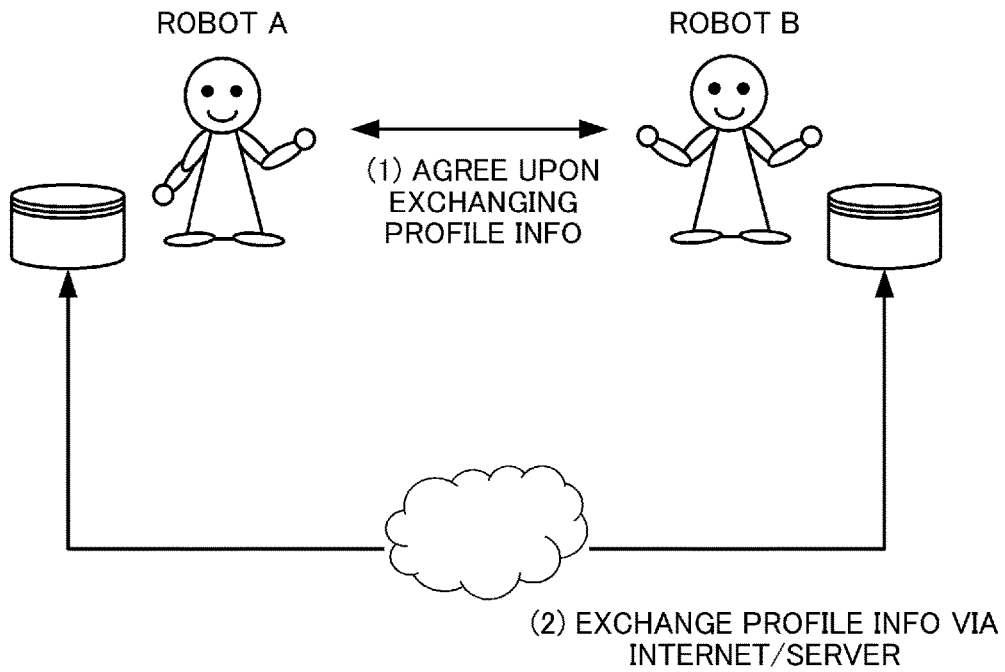
FIG. 10A and FIG. 10B are diagrams depicting the configuration of the voice interaction robot and a profile information exchange method according to a modification.

The communication between the voice interaction robots need not always be direct wireless communication, but may be communication via Internet or server apparatus as illustrated in FIG. 10A. In this case, detection of the presence of another voice interaction robot and the agreement to start an exchange of profile information may be performed by direct wireless communication, and an exchange of profile information may be performed by communication via Internet or server apparatus.

Figure 10B:
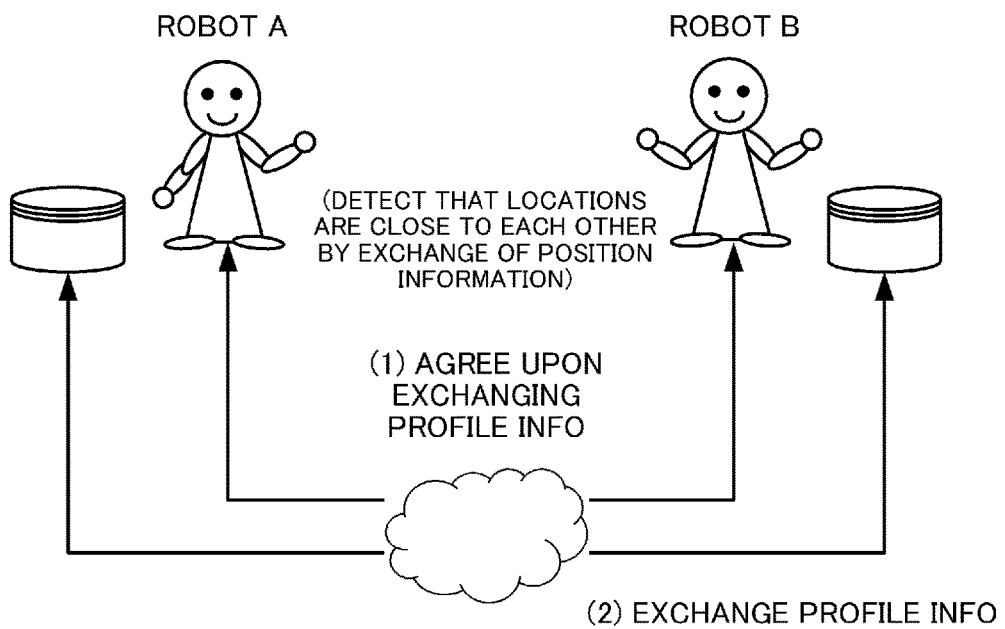

The voice interaction robot illustrated in FIG. 10B need not always perform direct wireless communication with another voice interaction robot. In this case, the presence of another nearby voice interaction robot can be recognized by position information of a robot or user managed by the server. Agreement of an exchange of profile information can also be performed via the server.

<Modification 2>

Figure 11A:
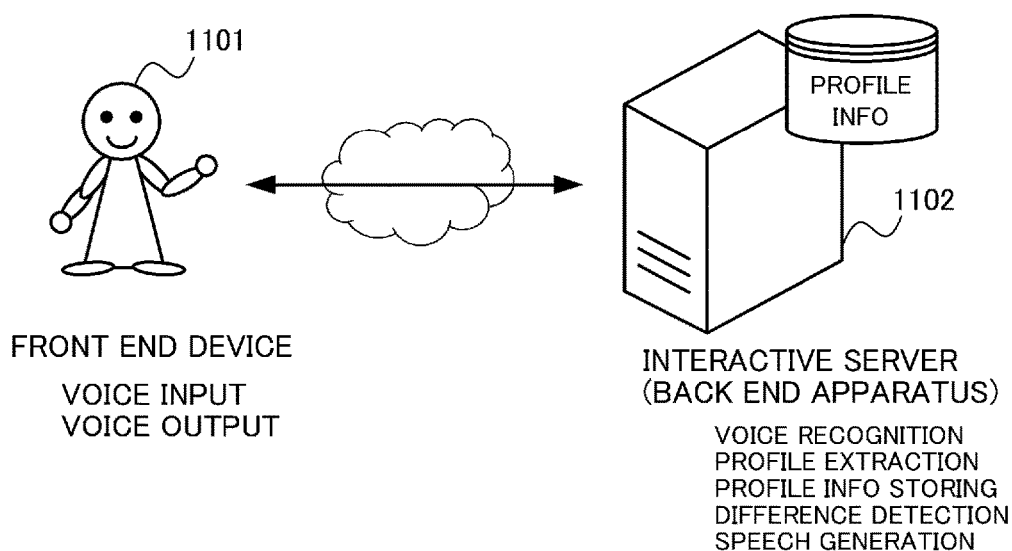
FIG. 11A and FIG. 11B are diagrams depicting the configuration of the voice interaction robot and a profile information exchange method according to a modification.

The above description is based on the assumption that the voice interaction robot is constructed as one apparatus, but the voice interaction apparatus may be implemented by a plurality of apparatuses which are linked via communication. For example, as illustrated in FIG. 11A, the voice interaction apparatus (voice interaction system) may be constituted by a front end apparatus 1101 which has the appearance of a robot, and an interactive server (back end apparatus) 1102 which can communicate with the front end apparatus 1101.

The front end apparatus 1101 includes at least a microphone (voice input unit) and a speaker (voice output unit). The interactive server 1102 executes such processing as voice recognition, extraction/storage/difference detection of profile information, and speech generation. The allotment of the functions between the front end apparatus 1101 and the interactive server 1102, however, is not limited to the above example and may be determined appropriately.

In this example, one interactive server is used, but the functions of the interactive server may be allocated to a plurality of apparatuses. Further, another apparatus, such as a smartphone, may interface between the front end apparatus 1101 and the interactive server 1102. In this case, the smartphone may only have a function to relay communication, or to execute some of the processing, such as voice recognition and/or dialog sentence generation.

Figure 11B:
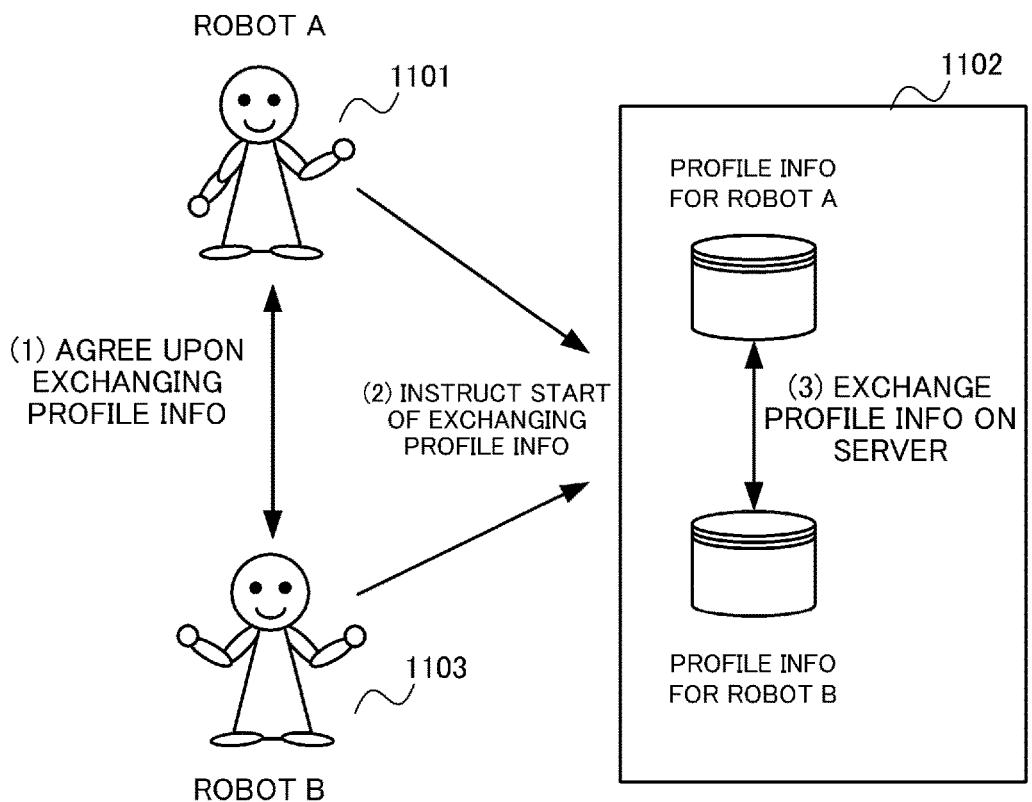

If this configuration is used, the profile information can be stored in the interactive server 1102. Therefore there is no need to exchange the profile information between robots (front end apparatuses) by communication. As illustrated in FIG. 11B, if each of robot A (1101) and robot B (1103) detects the presence of the other robot by direct communication, these robots instruct the interactive server 1102 to start the profile information exchange. When the start instruction of the profile information exchange is received from both robot A and robot B, the interactive server 1102 executes the exchange of profile information onboard the server.

By such a configuration as well, an effect similar to the above mentioned embodiment can be acquired. An additional advantage of this modification is that the level of voice recognition processing, dialog sentence generation and the like can be heightened. This is because it is easy to provide high level computing capabilities to an interactive server.

<Modification 3>

The profile information exchange between the voice interaction robots can also be implemented by methods other than the above mentioned methods. For example, the profile information may be exchanged when communication is established between the voice interaction robots or when the distance between the voice interaction robots becomes a threshold or less, even if users do not input the start instruction.

Figure 12:
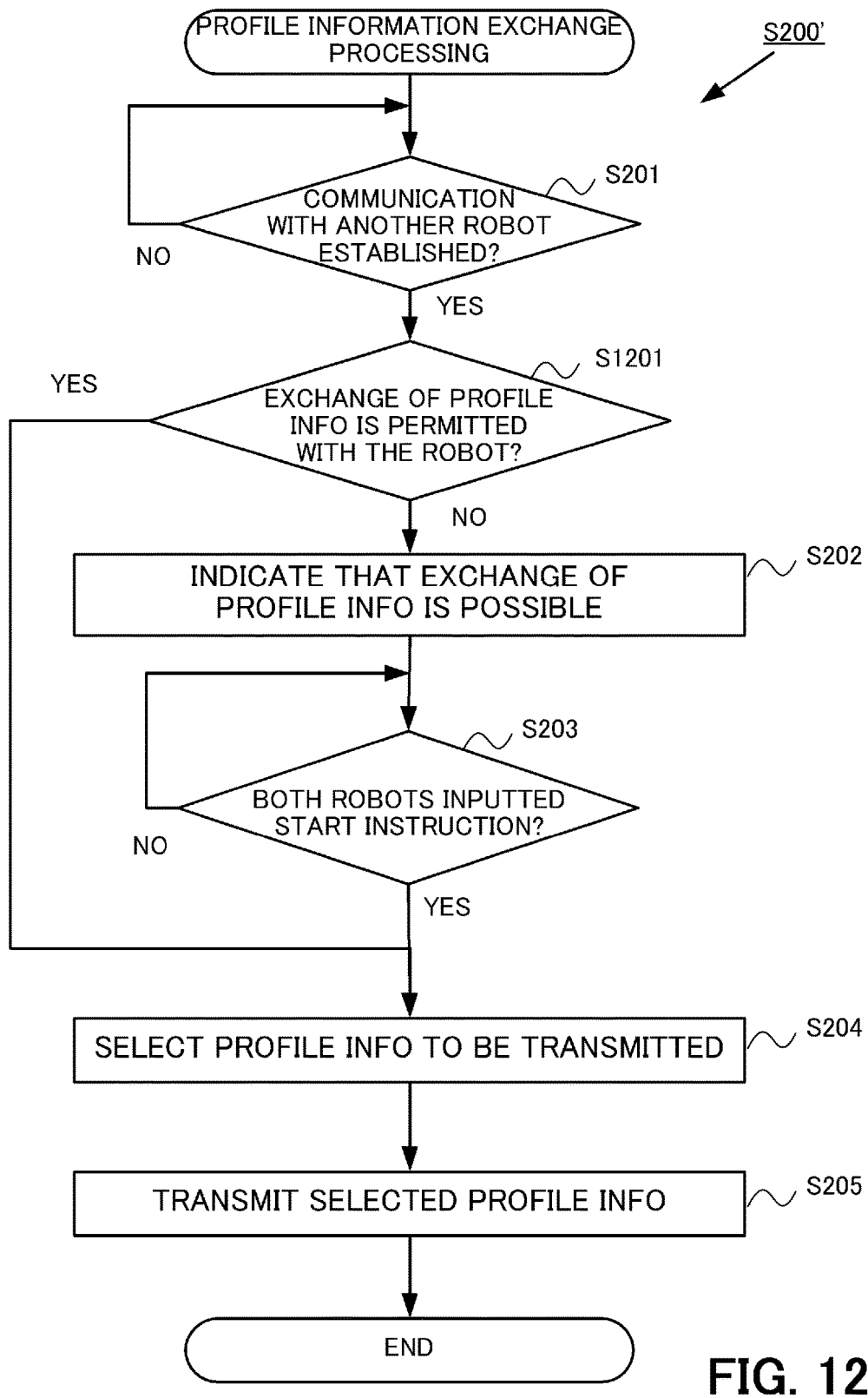
FIG. 12 is a flow chart depicting a flow of the profile information exchange processing according to a modification.

Alternatively, the user may register voice interaction robots in advance, which are permitted to perform automatic profile information exchange, so that profile information can be exchanged automatically with a voice interaction robot having this permission, regardless of whether the start instruction is inputted or not. FIG. 12 is a flow chart depicting the profile information exchange processing in this case. The flow chart in FIG. 12 is essentially the same as the flow chart in FIG. 6.

After communication is established with another robot, the voice interaction robot confirms in step S1201 whether the partner robot is a robot which is permitted to exchange profile information. The communication partner robot may be identified by exchanging individual IDs via wireless communication. If the communication partner is a robot which is permitted to exchange profile information (YES in S1201), processing may advance to step S204, and profile information exchange is started without waiting for the start instruction from the user. If the communication partner is a robot which is not permitted to exchange profile information in advance (NO in S1201), on the other hand, processing advances to step S202, and the profile information exchange is started after the start instruction from the user is received.

The profile information exchange between the robots may be performed when no robot is in conversation with the user. Further, when the robots are exchanging profile information, the state of exchanging profile information may be allowed to be recognized by sound or light. Then the users can receive the impressions that the robots are having a "conversation", and are exchanging the profile information.

<Modification 4>

The above embodiments are based on the assumption that the voice interaction robot is in possession of a user. In other words, it is assumed that an owner-user exists for each voice interaction robot. However, the voice interaction robot need not be a possession of a specific user. In this case as well, it is clear that the above mentioned structure of the present invention can be used.

<Modification 5>

In the above description, a favorite drink is used as an example of the profile information of the user, but the profile information may be other preferential information, or may be any arbitrary information on the user, including name, age, gender, race, height, weight, occupation, annual income, residence, birth place, personal relationships and possessions. Clearly for a skilled person in the art, no matter what the profile information content, the above processing, such as the difference detected between the received profile and owned profile information, the questions to verify the difference, and the update of the reliability value based on the answer to a question, can be applied in the same manner.

<Other>

The configurations of the above mentioned embodiments and modifications can be appropriately combined within a scope not departing from the technical concept of the present invention. Furthermore, the present invention may be implemented by making appropriate changes within a scope not departing from the technical concept of the present invention.

What is claimed is:

1. A voice interaction apparatus configured to store profile information of a user for each user, comprising:
   a voice recognizer configured to recognize content of a speech of a user;
   an extractor configured to extract profile information based on a result of the voice recognition, and to specify which user the profile information is associated with;
   a storage configured to store the extracted profile information in association with the user;
   an exchanger configured to exchange profile information with another voice interaction apparatus;
   a generator configured to generate a speech sentence to speak to the user based on the profile information of the user; and
   a comparator configured to detect a difference between profile information stored in the storage and profile information acquired from the another voice interaction apparatus via the exchanger,
   wherein the generator is further configured to generate a speech sentence to speak to the user based on the difference.

2. The voice interaction apparatus according to claim 1, wherein when there is an item which has a contradiction between the profile information stored in the storage and the profile information acquired from another voice interaction apparatus via the exchange unit, the generator generates a question about this item as the speech sentence.

3. The voice interaction apparatus according to claim 1, wherein when an item which is not stored in the storage unit exists in the profile information of the user acquired from another voice interaction apparatus via the exchanger, the generator generates a question about this item as the speech sentence.

4. The voice interaction apparatus according to claim 1, wherein the profile information of the user in the storage is updated based on an answer of the user to the speech sentence.

5. The voice interaction apparatus according to claim 4,
   wherein the storage stores a reliability value, which indicates the likelihood of the profile information of the user, in association with the profile information, and
   wherein the reliability value of the profile information is increased when it is determined that the profile information stored in the storage is correct based on the answer of the user to the question, and
   wherein the reliability value of the profile information is decreased when it is determined that the profile information stored in the storage is incorrect based on the answer of the user to the question.

6. The voice interaction apparatus according to claim 5, wherein correct/incorrect information is transmitted to the other voice interaction apparatus, the correct/incorrect information indicating whether the profile information acquired from another voice interaction apparatus is correct or not, and being determined based on the answer of the user to the speech sentence.

7. The voice interaction apparatus according to claim 6, wherein the reliability value of the profile information is updated based on the correct/incorrect information transmitted from another voice interaction apparatus.

8. The voice interaction apparatus according to claim 5, wherein the generator changes the speech content in accordance with the reliability value of the profile information.

9. The voice interaction apparatus according to claim 5, wherein the exchanger does not transmit the profile information to the other voice interaction apparatus when the reliability value of the profile information is lower than a threshold value.

10. The voice interaction apparatus according to claim 1,
    wherein the voice interaction apparatus is able to directly perform wireless communication with the other voice interaction apparatus, and
    wherein the exchanger directly exchanges profile information with the other voice interaction apparatus.

11. The voice interaction apparatus according to claim 1,
    wherein the voice interaction apparatus and the other voice interaction apparatus are able to communicate via a server, and
    wherein the exchanger exchanges profile information with the other voice interaction apparatus via the server.

12. The voice interaction apparatus according to claim 1,
    wherein the storages of the voice interaction apparatus and the other voice interaction apparatus exist on a server, and
    wherein the voice interaction apparatus and the other voice interaction apparatus exchange profile information onboard the server.

13. The voice interaction apparatus according to claim 1,
wherein the voice interaction apparatus is able to directly perform wireless communication with the other voice interaction apparatus, and
wherein the exchanger exchanges profile information with the other voice interaction apparatus when direct wireless communication with the other voice interaction apparatus is established.

14. The voice interaction apparatus according to claim 13, wherein the exchanger exchanges the profile information with the other voice interaction apparatus when a start instruction is further received from the user.

15. The voice interaction apparatus according to claim 14,
wherein a permitted voice interaction apparatus is memorized in advance, and
wherein when direct wireless communication is established between the permitted voice interaction apparatus, the profile information is exchanged with the permitted voice interaction apparatus regardless of whether the start instruction is received from the user or not.

16. A voice interaction method performed by a voice interaction apparatus configured to store profile information of a user for each user, the method comprising:

a voice recognition step of recognizing content of a speech of a user,
an extracting step of extracting profile information based on a result of the voice recognition, and specifying which user the profile information is associated with;
a storing step of storing the extracted profile information in association with the user;
an exchanging step of exchanging profile information with another voice interaction apparatus;
a generating step of generating a speech sentence to speak to the user based on the profile information of the user; and
a comparing step of detecting a difference between profile information stored by the storing and profile information acquired from the another voice interaction apparatus via the exchanging,
wherein the generating further generates a speech sentence to speak to the user based on the difference.

17. A non-transitory computer-readable storage medium storing therein a computer program for causing a computer to execute each step of the method according to claim 16.

* * * * *